United States Patent
Han (10) Patent No.: US 9,544,241 B2
(45) Date of Patent: Jan. 10, 2017

(54) QUEUE SCHEDULING METHOD, APPARATUS AND SYSTEM

(71) Applicant: ZTE CORPORATION, Shenzhen, Guangdong Province (CN)

(72) Inventor: Laiquan Han, Shenzhen (CN)

(73) Assignee: Sanechips Technology Co., LTD. (CN)

( * ) Notice: Subject to any disclaimer, the term of this patent is extended or adjusted under 35 U.S.C. 154(b) by 0 days.

(21) Appl. No.: 14/439,854

(22) PCT Filed: Oct. 22, 2013

(86) PCT No.: PCT/CN2013/085665
§ 371 (c)(1),
(2) Date: Apr. 30, 2015

(87) PCT Pub. No.: WO2014/067409
PCT Pub. Date: May 8, 2014

(65) Prior Publication Data
US 2015/0295842 A1 Oct. 15, 2015

(30) Foreign Application Priority Data
Oct. 30, 2012 (CN) .......................... 2012 1 0422828

(51) Int. Cl.
*H04L 12/863* (2013.01)
*H04L 12/747* (2013.01)
(Continued)

(52) U.S. Cl.
CPC ............... *H04L 47/62* (2013.01); *H04L 45/74* (2013.01); *H04L 45/742* (2013.01); *H04L 47/12* (2013.01);
(Continued)

(58) Field of Classification Search
CPC ........ H04L 45/00; H04L 45/74; H04L 45/742;
H04L 47/12; H04L 47/17; H04L 47/62;
H04L 47/621; H04L 47/2408; H04L 47/2441; H04L 47/6215; H04L 47/6275; H04L 47/6295
(Continued)

(56) References Cited

U.S. PATENT DOCUMENTS 5,729,540 A * 3/1998 Wegrzyn ............... H04J 3/1682
370/336
6,182,120 B1 * 1/2001 Beaulieu ............... G06F 9/4881
709/200

(Continued)

FOREIGN PATENT DOCUMENTS

CN 101252534 A 8/2008
CN 102377682 A 3/2012
(Continued)

OTHER PUBLICATIONS

Jongsoo Jeong et al. "A QoS-Aware Data Aggregation in Wireless Sensor Networks" Feb. 7-10, 2010 ICACT 2010. pp. 156-161, ISBN: 978-89-5519-146-2.
(Continued)

*Primary Examiner* — Tri H Phan
(74) *Attorney, Agent, or Firm* — Plumsea Law Group, LLC (57) ABSTRACT

A queue scheduling method, apparatus and system are provided. The method comprises: performing categorizing processing on a message, and forwarding a message in a sub-queue, wherein, performing categorizing processing on a message comprises: receiving the message, obtaining a next hop address of the message, and adding the message to a sub-queue corresponding to the next hop address of the message.

13 Claims, 3 Drawing Sheets

(51) Int. Cl.
  *H04L 12/865* (2013.01)
  *H04L 12/851* (2013.01)
  *H04L 12/741* (2013.01)
  *H04L 12/801* (2013.01)
(52) U.S. Cl.
  CPC ........... *H04L 47/17* (2013.01); *H04L 47/2441* (2013.01); *H04L 47/621* (2013.01); *H04L 47/6275* (2013.01)
(58) Field of Classification Search
  USPC .............. 370/229–240, 351, 389–394, 400–402, 370/412–430
  See application file for complete search history.

(56) References Cited

U.S. PATENT DOCUMENTS

| | | | |
|---|---|---|---|
| 6,560,237 B1* | 5/2003 | Hiscock | H04L 47/34 370/390 |
| 8,520,673 B2* | 8/2013 | Chen | 370/312 |
| 2002/0141403 A1 | 10/2002 | Akahane et al. | |
| 2003/0016685 A1* | 1/2003 | Berggreen | H04L 12/5693 370/412 |
| 2003/0048792 A1* | 3/2003 | Xu | H04L 49/104 370/400 |
| 2004/0120325 A1* | 6/2004 | Ayres | H04L 12/5693 370/395.42 |
| 2005/0243837 A1* | 11/2005 | Boyd | H04L 45/00 370/395.52 |
| 2008/0222651 A1* | 9/2008 | Anderson | G06Q 10/06 719/315 |
| 2014/0280627 A1* | 9/2014 | Ross | H04L 51/14 709/206 |

FOREIGN PATENT DOCUMENTS

| | | |
|---|---|---|
| JP | 2006180166 A | 7/2000 |
| JP | 2002300193 A | 10/2002 |
| JP | 2004214790 A | 7/2004 |
| JP | 2007049626 A | 2/2007 |
| JP | 2011045007 A | 3/2011 |
| WO | 03/090419 A1 | 10/2003 |

OTHER PUBLICATIONS

Yann-Hang Lee et al. "Circular Window Control Schemes in Fast Packet Switches" Sep. 20, 1995, Computer Communications and Networks. pp. 116-123. ISBN: 978-0-8189-7180-7.
European Search Report issued Oct. 9, 2015 in European Patent Application No. EP13852258.8.
Office Action issued Jun. 21, 2016 for Japanese Application No. 2015-540033, 3pp.

* cited by examiner

QUEUE SCHEDULING METHOD, APPARATUS AND SYSTEM

CROSS-REFERENCE TO RELATED APPLICATION(S)

This application is the U.S. National Phase application of PCT application number PCT/CN2013/085665 having a PCT filing date of Oct. 22, 2013, which claims priority of Chinese patent application 201210422828.7 filed on Oct. 30, 2012, the disclosures of which are hereby incorporated by reference.

TECHNICAL FIELD

The present document relates to relates to the communication field, and in particular, to a queue scheduling method, apparatus and system.

BACKGROUND OF THE RELATED ART

The data quantity processed by the network becomes larger and larger at present, the network congestion is extremely common, and the users cannot obtain the resources in time due to the congestion, which is the source causing the serving performance degradation. The network must be managed and controlled when the congestion occurs, and the common method is to use the queue technology.

The existing queue technology usually uses the technologies, such as, Strict Priority (SP), Weighted Round Robin (WRR), Deficit Weighted Round Robin (DWRR), etc., or uses the combination of two therein; however, in the related art, the router performs forwarding by regarding a single message as a unit. Because the processing procedure for a message or data packet by the router generally includes stages, such as, classifying, forwarding, etc., then each data packet is modified one by one and encapsulated as the second layer frame information and sent to the destination address of the message; during that process, the router needs to perform function conversion and function recovery processing of every module, which will take time; due to the above-mentioned reason, the queue scheduling technology taking the single message as the forwarding unit will cause the problem that the time consumption of the router function switchover is too large and the network interface congestion is triggered when the forwarding amount of the message is too larger.

With increasing development of the network technology, the phenomenon that the forwarding amount of the message is too large often occurs, how to solve the network congestion caused by the too large forwarding amount of the message is a technical problem which needs to be solved urgently by those skilled in the art.

SUMMARY

In order to solve the problem of the network congestion when the forwarding amount is too large caused by frequent switching of the router functions due to forwarding the single message in the current queue scheduling technology, the embodiment of the present document provides a queue scheduling method, apparatus and system.

The embodiment of the present document provides a queue scheduling method, comprising:
performing categorizing processing on a message; and performing forwarding processing on a message in a sub-queue;
wherein, said performing categorizing processing on a message comprises:
receiving the message;
obtaining a next hop address of the message; and
adding the message to a sub-queue corresponding to the next hop address of the message.

Alternatively, the method further comprises:
after obtaining the next hop address of the message, modifying message parameters of the message; wherein, the message parameter is one or more of header field parameters of the message.

Alternatively, the method further comprises:
setting, in the sub-queue, a header used for carrying information of a message total length and a number of messages in the sub-queue;
wherein, adding the message to a sub-queue corresponding to the next hop address of the message comprises:
extracting the header of the sub-queue;
updating the information of the message total length and the number of messages carried by the header; and
adding the message to the sub-queue.

Alternatively, performing forwarding processing on a message in the sub-queue comprises:
selecting a sub-queue of messages to be forwarded;
obtaining a destination address of the sub-queue; and
forwarding at least one message in the sub-queue to a device corresponding to the destination address of the sub-queue.

Alternatively, the method further comprises:
when the queue comprises at least two sub-queues, performing categorizing processing on a newly received message while performing the forwarding processing on the message in the sub-queue.

Alternatively, said performing the forwarding processing on the message in the sub-queue comprises:
forwarding all messages in the sub-queue to the device corresponding to the destination address of the sub-queue.

Alternatively, the method further comprises:
setting a priority of the sub-queue;
wherein, said performing the forwarding processing on the message in the sub-queue comprises: preferentially selecting a message of a sub-queue with a high priority for forwarding processing.

The embodiment of the present document further provides a queue scheduling apparatus, comprising: a setting unit, a receiving unit, a categorizing unit and a forwarding unit which are connected in turn; wherein,
the setting unit is configured to: set at least a sub-queue in a queue;
the receiving unit is configured to: receive a message and forward the message to the categorizing unit for performing categorizing processing;
the categorizing unit is configured to: obtain a next hop address of the message, and add the message to a sub-queue corresponding to the next hop address of the message; and
the forwarding unit is configured to: forward the message in the sub-queue after the message is categorized.

Alternatively, the categorizing unit is further configured to: after obtaining the next hop address of the message, modify message parameters of the message; wherein, the message parameter is one or more of header field parameters of the message.

Alternatively, the setting unit is further configured to: set, in the sub-queue, a header used for carrying information of a message total length and a number of messages in the sub-queue; and the categorizing unit is configured to: add the message to the sub-queue corresponding to the next hop address of the message by means of:

reading the header of the sub-queue; updating the information of the message total length and the number of messages carried by the header; and adding the message to the sub-queue.

Alternatively, the forwarding unit is configured to: forward the message in the sub-queue by means of:

selecting a sub-queue of messages to be forwarded; obtaining a destination address of the sub-queue; and forwarding at least one message in the sub-queue to a device corresponding to the destination address of the sub-queue.

Alternatively, the categorizing unit is further configured to: when the queue comprises at least two sub-queues and when the forwarding unit is forwarding the message in the sub-queue, perform categorizing processing on a newly received message.

Alternatively, the forwarding unit is configured to: forward the message in the sub-queue by means of:

forwarding all messages in the sub-queue to the device corresponding to the destination address of the sub-queue.

Alternatively, the setting unit is further configured to: set a priority of the sub-queue; and the forwarding unit is further configured to: forward the message in the sub-queue by means of: preferentially selecting a message of a sub-queue with a high priority for forwarding processing.

The embodiment of the present document further provides a queue scheduling system, comprising: at least one message sending apparatus, at least one message receiving apparatus, and at least one above-mentioned queue scheduling apparatus; wherein, the queue scheduling apparatus is configured to: receive a message sent by the message sending apparatus, and forward the message to the message receiving apparatus.

By implementing the present document, a new queue scheduling technology is provided, and the technology realizes the purpose of classifying and categorizing according to the next hop address of the message through categorizing the message to the sub-queue corresponding to the next hop address of the message during the queuing stage of the messages, so that only the messages matching with the destination information of a sub-queue exist in that sub-queue.

Alternatively, when the message is forwarded, the destination address of the sub-queue only needs to be read once, and the destination addresses of the messages no longer need to be read one by one, which can realize the forwarding of the messages in the sub-queue, lighten the work load of the router, realize the function of forwarding multiple messages in one processing and improve the forwarding efficiency of the router.

PREFERRED EMBODIMENTS OF THE INVENTION

The embodiment of the present document is explained and described in detail with reference to the accompanying drawings hereinafter. It should be illustrated that, in the case of not conflicting, the embodiments in the present application and features in these embodiments can be combined with each other.

In order to solve the problem of the network congestion when the forwarding amount is too large caused by frequent switching of the router functions due to forwarding the single message in the current queue scheduling technology, the embodiment of the present document provides a queue scheduling method on the basis of setting at least one sub-queue in the message forwarding queue; with the queue scheduling method, it is to categorize the messages with a same next hop forwarding address into a same sub-queue firstly, which realizes the function that when forwarding the message, only the destination address of the sub-queue needs to be read while the destination addresses of the messages no longer need to be read one by one to enable the messages in the sub-queue to be forwarded to the next hop address of its destination address; and then, all or multiple messages in the sub-queue of the destination address are read once, which realizes the purpose that forwarding multiple messages only needs to perform the function switching once, reduces the frequency and time of the function switchover/recovery of the relative module in the router and increases the processing efficiency of the router.

Figure 1:
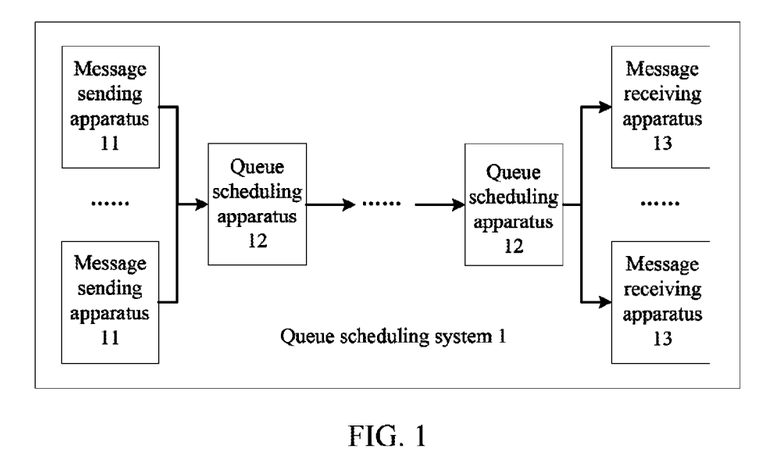
FIG. 1 is a structure diagram of a queue scheduling system in an embodiment of the present document.

FIG. 1 is a structure diagram of a queue scheduling system in an embodiment of the present document; it can be seen from FIG. 1 that, in the embodiment, the queue scheduling system provided by the present document includes at least one message sending apparatus 11, at least one queue scheduling apparatus 12, and at least one message receiving apparatus 13; wherein, the message sending apparatus 11 is used for generating and/or sending the message; the message receiving apparatus 13 is used for receiving and/or forwarding the message; and the queue scheduling apparatus 12 is used for receiving the message sent by the message sending apparatus 11 and forwarding the message to the message receiving apparatus 13.

In the above-mentioned embodiment, the message sending apparatus 11 can be a service application providers, etc., the message receiving apparatus 13 can be a mobile terminal or a Personal Computer (PC) terminal, etc., and the queue scheduling apparatus 12 can be a router or a network exchanger, etc.; it can be predicted that, because the queue scheduling apparatus 12 possesses the functions of receiving and forwarding the message simultaneously, in other embodiments, the queue scheduling apparatus 12 can replace the message sending apparatus 11 or the message receiving apparatus 13 to realize the functions of sending or receiving its messages.

Figure 2:
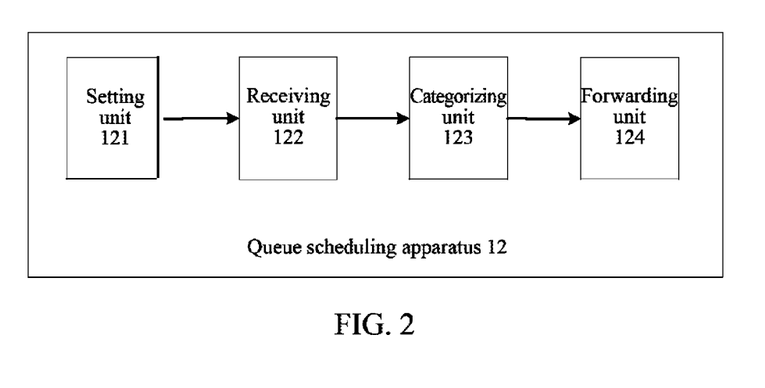
FIG. 2 is a structure diagram of a queue scheduling apparatus 12 in the queue scheduling system as shown in FIG. 1.

In order to solve the problem of the network congestion when the forwarding amount is too large caused by frequent switching of the router functions due to forwarding the single message in the current queue scheduling technology, the embodiment of the present document improves the current queue scheduling apparatus 12, and the structure diagram of the improved queue scheduling apparatus 12 is shown in FIG. 2.

It can be known from FIG. 2, in an embodiment, the queue scheduling apparatus 12 provided by the embodiment of the present document includes: a setting unit 121, a receiving unit 122, a categorizing unit 123 and a forwarding unit 124 which are connected in turn; wherein, the setting unit 121 is configured to: set at least one sub-queue in a queue;

the receiving unit 122 is configured to: receive a message and forward the received message to the categorizing unit 123 for performing categorizing processing;

the categorizing unit 123 is configured to: obtain a next hop address of the message, and add the message to a sub-queue corresponding to the next hop address of the message, and send the message of the sub-queue to the forwarding unit 124 for forwarding; and the forwarding unit 124 is configured to: forward the message in the sub-queue after the message is categorized.

Alternatively, in other embodiments, the setting unit 121, the receiving unit 122, the categorizing unit 123 and the forwarding unit 124 of the above-mentioned embodiment work according to the following record.

The mode of setting the sub-queue in the queue by the setting unit 121 is: setting multiple sub-queues in the forwarding queue formed by all messages received by the queue scheduling apparatus 12, wherein, the sub-queues one-to-one correspond to the next hop forwarding devices of the message forwarding path of the queue scheduling apparatus 12, that is, the message receiving apparatuses 13; and setting the destination address of the sub-queue as the unique identification information of the message receiving apparatus 13 corresponding to the sub-queue. For example, the objective information of the first sub-queue is set as the media access control (MAC) information of the first message receiving apparatus 13, in this way, the corresponding relation between the sub-queue and the next hop forwarding device (the message receiving apparatus 13) is established, and it can be seen that, the number of the sub-queues is the same as the number of the next hop devices of the queue scheduling apparatus 12, and one-to-one corresponding to each other.

The receiving unit 122 is used for receiving the message sent by the message sending apparatus 11, and transfers the received message to the categorizing unit 123 for the categorizing processing.

The mode of obtaining the next hop address of the message by the categorizing unit 123 can be to analyze the message, obtain the destination information of the message, inquire about the routing list according to the destination information, and determine the next hop address of the message; and then to determine the (the message receiving apparatus 13) of the message according to the next hop address, and determine to which sub-queue the message needs to be added according to the unique identification information of the next hop forwarding device (the message receiving apparatus 13); and to add the message to the sub-queue corresponding to the next hop address of the message, and transfer the message of the sub-queue to the forwarding unit 124 for forwarding.

The forwarding unit 124 can select to forward a single message, and also can select to forward by taking multiple messages/all messages in the sub-queue as the unit while forwarding the message.

Alternatively, in other embodiments, the setting unit 121 of the above-mentioned embodiment is further configured to set, in the sub-queue, a header used for carrying information of a message total length and the number of messages in the sub-queue; and the categorizing unit 123 is configured to add the message to the sub-queue corresponding to the next hop address of the message by the following mode: reading the header of the sub-queue; updating the information of the message total length and the number of messages carried by the header; and adding the message to the sub-queue. The process can be:

adding the number of messages of the sub-queue by one;
updating the message length of the sub-queue; and
adding the message to the sub-queue.

The above-mentioned processing procedure can also include: updating the available message length of the sub-queue.

Alternatively, in other embodiments, the setting unit 121 of the above-mentioned embodiment is further configured to set, in the sub-queue, a header used for carrying information of a message total length and the number of messages in the sub-queue; and the categorizing unit 123 is configured to add the message to the sub-queue corresponding to the next hop address of the message by the following mode: reading the header of the sub-queue; judging whether the available message length of the sub-queue carried by the header is greater than the message length of the message that needs to be added to the sub-queue, and adding the message to the sub-queue only when the available message length of the sub-queue is greater than the message length of the message that needs to be added to the sub-queue. The judgment process can be as follows.

The categorizing unit 123 judge whether the available message length of the sub-queue is not less than the message length of the message; wherein, the available message length of the sub-queue is obtained after the message length which can be contained totally by the sub-queue deducted by the message lengths of all messages in the sub-queue; the message length which can be contained totally by the sub-queue can be calculated and set according to the processing capability of the next hop forwarding device (the message receiving apparatus 13) of the message and/or the network communication state and/or the forwarding capability of the queue scheduling apparatus 12, therefore, the message length which can be contained totally by each sub-queue may be different.

If the available message length of the sub-queue is not less than the message length of the message, then the message can be added into the sub-queue; and if the available message length of the sub-queue is less than the message length of the message, then the message cannot be added into the sub-queue, and the message is discarded.

Alternatively, in other embodiments, the categorizing unit 123 of the above-mentioned embodiment is also used for, after obtaining the next hop address of the message, modifying the message parameters of the message, wherein, the message parameter is one or more of the header field parameters of the message, for example, the parameters in the header field parameters of the message, such as, the Time To Live (TTL) parameter, the Cyclic Redundancy Check (CRC) parameter, and the MAC parameter, etc.; wherein, the TTL parameter is a value in the internet protocol (IP) packet, which tells whether the time of the network data packet in the network is too long and the network data packet should be abandoned; the CRC parameter is the most frequently-used error check code in the data communication field, characterized in that the lengths of the information field and the check field can be selected at will; and the MAC parameter is also called the MAC address or the hardware address, used for defining the location of the network device;

and these parameters are all common-used terms in the related art, and their modification rules will not go into details any more.

Alternatively, in other embodiment, the forwarding unit 124 of the above-mentioned embodiment forwards the messages in the sub-queue by using the following mode: selecting a sub-queue of messages to be forwarded; obtaining a destination address of the sub-queue; and forwarding at least one message in the sub-queue to a device corresponding to the destination address of the sub-queue.

Alternatively, in other embodiments, the forwarding unit 124 of the above-mentioned embodiment forwards the messages in the sub-queue by using the following mode: selecting a sub-queue of messages to be forwarded; obtaining a destination address of the sub-queue; and forwarding all messages in the sub-queue to a device corresponding to the destination address of the sub-queue.

In the above-mentioned two embodiments, the mode of forwarding the message by the forwarding unit 124 can be:

detecting the header of the sub-queue, and obtaining the destination address corresponding to the sub-queue;

according to the information of the message length and the number of messages of the sub-queue carried by the header, forwarding at least one and/or all messages of the sub-queue to the device corresponding to the destination address of the sub-queue, such as, the message receiving apparatus 13, etc.

The above-mentioned processing procedure can also include: resetting the information of the message total length and the number of messages carried by the header of the sub-queue, and performing the message forwarding procedure of the next sub-queue.

Alternatively, in other embodiments, when the queue includes at least two sub-queues and when the forwarding unit 124 is forwarding the message in the sub-queue, the categorizing unit 123 is further configured to perform categorizing processing on a message newly received by the receiving unit 122. Because, in the existing queue scheduling technology, no processing is performed on the data packet or message in the period of time after entering the queue and before forwarding, which wastes the time greatly; that is, causing the processing efficiency of the router to be reduced; in order to rationally use the time period of waiting for forwarding, the present application further provides a processing mechanism. In the parallel processing mechanism provided by the embodiment of the present document, when the router forwards the message, it still can perform the categorizing (classification and modification) processing on the newly received message, which can be achieved by the coprocessor of the router.

Alternatively, in other embodiments, the setting unit 121 of the above-mentioned embodiment is further used for setting the priority of each sub-queue; the forwarding unit 124 forwards the messages in the sub-queue by the following mode: preferentially selecting a message of a sub-queue with a high priority for forwarding processing; and the mode of setting the priority of the sub-queue by the setting unit 121 includes but not limited to the technologies such as the SP, the WRR and the DWRR, etc.; and after the setting unit 121 sets the priority of each sub-queue, the forwarding unit 124 selects the sub-queue in which the messages need to be sent according to the priority of each sub-queue and the preset rule, and sends at least one message in its selected sub-queue to the next hop forwarding device corresponding to the sub-queue (the message receiving apparatus 13).

It can be predicted that, under the situation that each function module does not conflict, the functions of the function modules in all above-mentioned embodiments can be used in combination.

Figure 3:
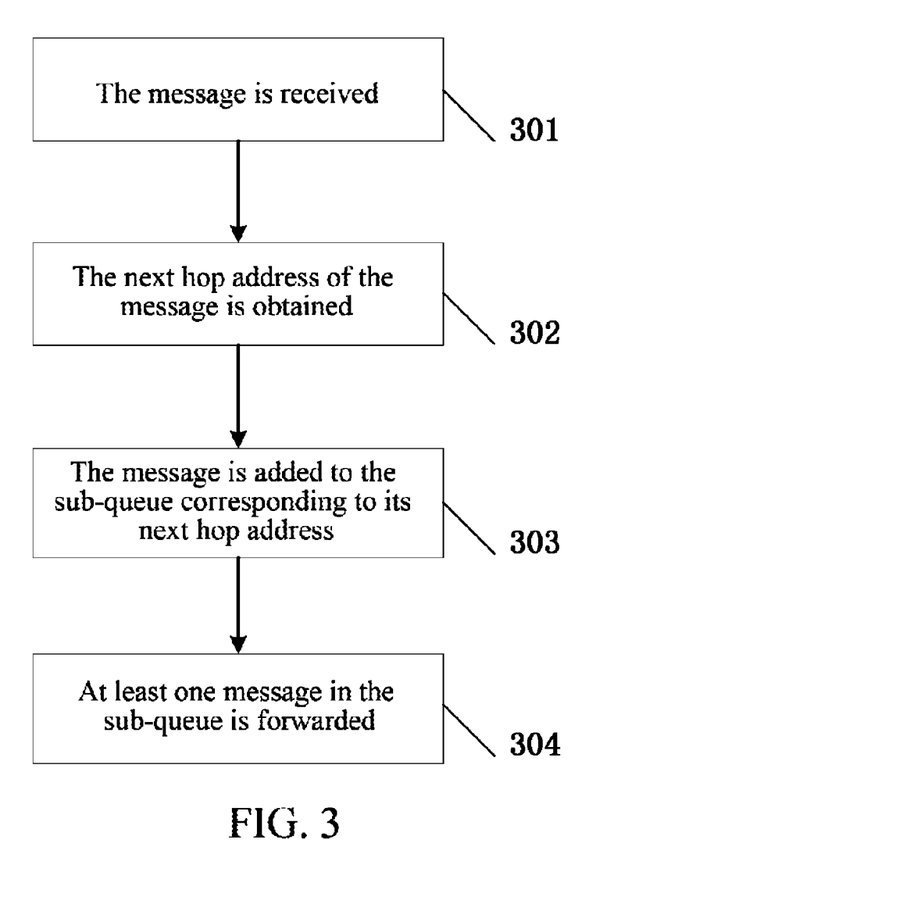
FIG. 3 is a flow chart of a queue scheduling method in an embodiment of the present document.

After the above-mentioned explanation for each function module in the FIG. 1 and FIG. 2, the implementation steps of the queue scheduling method provided by the present application are explained in combination with FIG. 3.

FIG. 3 is a flow chart of a queue scheduling method in an embodiment of the present document; it can be seen from FIG. 3, in the present embodiment, the queue scheduling method provided by the embodiment of the present document includes the following steps.

In step 301, the message is received.

The receiving unit 122 receives the message, and transfers the message to the categorizing unit 123.

In step 302, the next hop address of the message is obtained.

The mode of obtaining the next hop address of the message by the categorizing unit 123 can be: obtaining the destination address of the message, inquiring about the routing list according to the destination address, and determining the next hop address of the message.

After obtaining the next hop address of the message, the method further includes modifying message parameters of the message; wherein, the message parameter is one or more of header field parameters of the message.

In step 303, the message is added to the sub-queue.

Before adding the message to the sub-queue, the method further includes: judging whether the message can be added to the sub-queue corresponding to the next hop address; and the judgment process is: judging whether the message length of the message is not greater than the available message length of the sub-queue; if the message length of the message is not greater than the available message length of the sub-queue, then the message can be added to the sub-queue; while if the message length of the message is greater than the available message length of the sub-queue, then the message cannot be added to the sub-queue.

Adding the message to the sub-queue corresponding to the next hop address is: extracting a header of the sub-queue, wherein, the header of the sub-queue is used for carrying information of a message total length and the number of messages in the sub-queue; updating the information of the message total length and the number of messages carried by the header; and adding the message to the sub-queue. The process can be:

adding the number of messages of the sub-queue by one;
updating the message length of the sub-queue; and
adding the message to the sub-queue.

Alternatively, after adding the message to the sub-queue, the method also includes: updating the available message length of the sub-queue.

In step 304, at least one message of the sub-queue is forwarded.

The forwarding unit 124 forwarding the message includes:

selecting one sub-queue as the target sub-queue of forwarding;

obtaining the destination address of the sub-queue; and forwarding at least one message in the sub-queue to the device corresponding to the destination address of the sub-queue.

Alternatively, all messages in the sub-queue can be forwarded to the device corresponding to the destination address of the sub-queue.

When the sub-queue is set with the priority, the sub-queue with the high priority is preferentially selected as the target sub-queue of forwarding.

Alternatively, when the queue includes at least two sub-queues, the queue scheduling method also includes: while the message of sub-queue is forwarded, performing the categorizing processing on the newly received message.

In order to better explain the concept of the present application, the embodiment of the present document is explained in detail now in combination the real life hereinafter.

Figure 4:
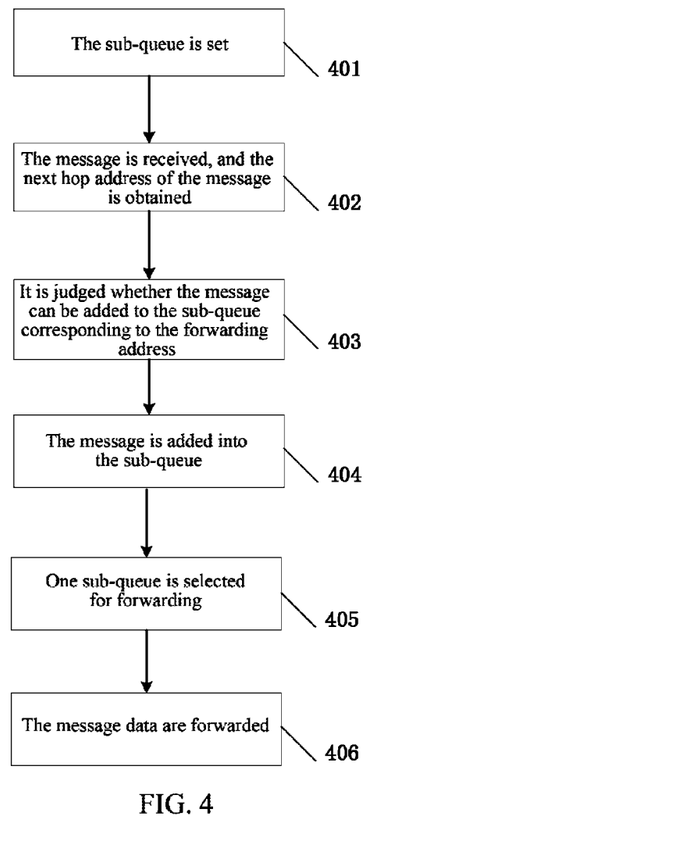
FIG. 4 is a flow chart of a queue scheduling method in an application example of the present document.

Now it is explained by combining with FIG. 1 to FIG. 3; in the embodiment, the queue scheduling apparatus 12 includes a setting unit 121, a receiving unit 122, a categorizing unit 123, and a forwarding unit 124; for easy explanation, it is supposed as follows: there are 8 next hop devices in the queue scheduling system, that is, 8 message receiving apparatuses 13; and the workflow of the queue scheduling apparatus 12 is explained hereinafter, as shown in FIG. 4, including the following steps.

In step 401, the sub-queue is set.

The setting unit 121 sets the number of sub-queues in the message queue according to the number of the next hop devices (the message receiving apparatuses 13) of the router, establishes the corresponding relation between the sub-queue and the network interface; the sub-queue 1 is corresponding to the first message receiving apparatus 13, . . . , the sub-queue N is corresponding to the Nth message receiving apparatus 13; the header of the sub-queue N is set according to the processing capacity of the Nth message receiving apparatus 13, and the header carries the message total length L and the number of messages M currently contained by the sub-queue, and the destination information of the sub-queue N is the Nth message receiving apparatus 13.

In step 402, the message is received, and the next hop address of the message is obtained, and the next hop address is the mark number of the next hop device (the message receiving apparatus 13) of the router.

The receiving unit 122 receives the message i, and transfers the message i to the categorizing unit 123, and the categorizing unit 123 extracts the destination address of the message i and determines the next hop address of the message i according to the destination address.

In step 403, it is judged whether the message can be added to the sub-queue corresponding to the forwarding address.

The categorizing unit 123 obtains the next hop device i (the message receiving apparatus 13) receiving the message i according to the next hop address of the message i, and judges whether the message i can be added to the sub-queue i corresponding to the next hop device i. The judgment mode can be comparing the message length Ii of the message i with the available message length $\Delta L$ of the sub-queue I; when $\Delta L \geq Ii$, the message i can be added to the sub-queue i, wherein, the $\Delta L$ is determined by the number of messages M in the sub queue i, the message total length L and the processing capacity of the next hop device i of the sub-queue i together; and if $\Delta L < Ii$, then the message i cannot be added to the sub-queue i.

In step 404, the message is added into the sub-queue.

The categorizing unit 123 updates the number of messages M' included in the sub-queue i as M'+1; the categorizing unit 123 updates the message L' included in the sub-queue i as L'+Ii; and the categorizing unit 123 adds the message i to the sub-queue i.

The categorizing unit 123 also can update the available message length $\Delta L$ of the sub-queue i as $\Delta L - Ii$. Now, it is supposed that there are 8 messages in the sub-queue 1, there are 12 messages in the sub-queue 2, . . . , and there are n messages in the sub-queue N.

In step 405, one sub-queue is selected for forwarding.

According to the circulation principle or the priority principle, the sub-queue K is selected for forwarding, and it is supposed K=3 here. While forwarding the messages of the sub-queue 3, if the receiving unit 122 newly receives a message, then it classifies and modifies the message, and adds the message to a certain sub-queue except the sub-queue 3.

In step 406, the message data are forwarded.

The forwarding unit 124 detects the header of the sub-queue K and the destination address corresponding to the sub-queue K, and obtains the next hop device K (the message receiving apparatus 13).

The forwarding unit 124 forwards at least one or all the messages of the sub-queue i to the destination address according to the information of the message length L' and the number of messages M' of the sub-queue i carried in the header information; for example, the 8 messages in the sub-queue 1, the 12 messages in the sub-queue 2, . . . , and the n messages in the sub-queue N are forwarded to their own corresponding next hop devices at one time; and for another example, at least one or all messages in the sub-queue i are forwarded to the ith next hop device K (the message receiving apparatus 13) corresponding to the sub-queue i.

The forwarding unit 124 also can reset the available message length $\Delta L$, the number of messages M and the message length L of the sub-queue K as initial values; and perform the forwarding operation of the message of the sub-queue (K+1).

In the above-mentioned embodiment, the functions of the categorizing unit 123 and the forwarding unit 124 are achieved by the coprocessor of the router.

In the queue scheduling technology provided in the present application, the route analysis operation is only performed once on all messages in the sub-queue 1, which saves 7 extra route matching processes. The route analysis operation is only performed once on all messages of the sub-queue 2, which saves 11 extra route matching processes; similarly, n−1 extra route matching processes are saved for the sub-queue N; it not only accelerates the forwarding efficiency of the message, but also lightens the strenuous route matching work of the router greatly.

The detection unit performs the classification, modification and processing operation, that is, the categorizing operation, on all messages in the sub-queue in the time period when the message waits for forwarding, which uses the time reasonably and increases the operating efficiency of the router greatly.

As the programmable router becomes more popular, especially the application of the relevant programmable coprocessor, the benefit brought by the improvement of the forwarding mode will be higher; by adopting the queue scheduling method and apparatus provided by the present application, the live switchover/recovery time of the queue scheduling module is reduced, and the forwarding efficiency of the router is improved.

Meanwhile, in order to realize the queue scheduling method provided in the above-mentioned embodiments, on the basis of the programmable router, the present application provides a computer application program, and the program is used for realizing the categorizing step and forwarding step in the queue scheduling method provided in the present application; and the example is as follows:

the program for realizing the categorizing step:
1: DA←Destination Address
2: next hop←lookup(DA)
3: if packetsize<freesize[next hop] then
4: number[next hop]++
5: length[next hop]←length [next hop]+packetsize
6: Add packet to queue next hop
7: freesize[next hop]←queuesize-length[next hop]
8: end if
the program for realizing the forwarding step:
1: while queue>0 do
2: next_hop←get interface (queue)
3: number←get number (queue)
4: forwarding (next_hop, length, number)
5: dequeue (queue)
6: queue←queue−1
7: end while It can be predicted that, the above-mentioned computer program is one preferable embodiment for realizing the queue scheduling method of the present application, and the modifications or the replacements or improvements made based on the above-mentioned codes will all belong to the protection scope of the present application.

The present application provides a storage medium, and the storage medium is used for storing the computer application program provided by the above-mentioned embodiment which is used for realizing the queue scheduling technology provided by the present application; in other embodiments, the storage medium is a mobile storage medium, such as Compact Disc (CD), Digital Video Compact Disc (DVCD) or U-disk, etc.

The above description is only for the embodiments of the present document and is not intended to limit the present application in any form. Any simple modification, equivalent and/or variation made to the above embodiments according to the technical essence of the present application should be embodied in the protection scope of the technical solution of the present application.

INDUSTRIAL APPLICABILITY

By adopting the technical solution of the embodiment of present document, the work load of the router is reduced, the function of forwarding multiple messages in one processing is realized, and the forwarding efficiency of the router is improved.

What we claim is:

1. A queue scheduling method, comprising:
performing categorizing processing on a message; and
performing forwarding processing on a message in a sub-queue;
wherein, said performing categorizing processing on a message comprises:
receiving the message;
obtaining a next hop address of the message;
and adding the message to a sub-queue corresponding to the next hop address of the message;
wherein, said performing forwarding processing on a message in a sub-queue comprises:
selecting a sub-queue of messages to be forwarded;
obtaining a destination address of the sub-queue; and
forwarding multiple messages in the sub-queue to a device corresponding to the destination address of the sub-queue at one time;
wherein the step of forwarding multiple messages in the sub-queue to a device corresponding to the destination address of the sub-queue at one time realizes the purpose that forwarding multiple messages only needs to perform the function switching once, reduces the frequency and time of the function switchover/recovery of the relative module in the router and increases the processing efficiency of the router.

2. The queue scheduling method according to claim 1, further comprising:
after obtaining the next hop address of the message, modifying message parameters of the message;
wherein, the message parameter is one or more of header field parameters of the message.

3. The queue scheduling method according to claim 1, further comprising:
setting, in the sub-queue, a header used for carrying information of a message total length and a number of messages in the sub-queue;
wherein, said adding the message to a sub-queue corresponding to the next hop address of the message comprises:
extracting the header of the sub-queue;
updating the information of the message total length and the number of messages carried by the header; and
adding the message to the sub-queue.

4. The queue scheduling method according to claim 1, further comprising:
when the queue comprises at least two sub-queues, performing the categorizing processing on a newly received message while performing the forwarding processing on the message in the sub-queue.

5. The queue scheduling method according to claim 1, wherein, said performing forwarding processing on a message in a sub-queue comprises:
forwarding all messages in the sub-queue to the device corresponding to the destination address of the sub-queue.

6. The queue scheduling method according to claim 1, further comprising:
setting a priority of the sub-queue;
wherein, said performing forwarding processing on a message in a sub-queue comprises: preferentially selecting a message of a sub-queue with a high priority for forwarding processing.

7. A queue scheduling apparatus, comprising: a setting unit, a receiving unit, a categorizing unit and a forwarding unit which are connected in turn; wherein,
the setting unit is configured to: set at least one sub-queue in a queue;
the receiving unit is configured to: receive a message and forward the message to the categorizing unit for performing categorizing processing;
the categorizing unit is configured to: obtain a next hop address of the message, and add the message to a sub-queue corresponding to the next hop address of the message; and
the forwarding unit is configured to: forward the message in the sub-queue after the message is categorized;
wherein, the forwarding unit is configured to: forward the message in the sub-queue by means of:
selecting a sub-queue of messages to be forwarded;
obtaining a destination address of the sub-queue; and
forwarding multiple messages in the sub-queue to a device corresponding to the destination address of the sub-queue at one time;
wherein the step of forwarding multiple messages in the sub-queue to a device corresponding to the destination address of the sub-queue at one time realizes the purpose that forwarding multiple messages only needs to perform the function switching once, reduces the frequency and time of the function switchover/recovery of the relative module in the router and increases the processing efficiency of the router.

8. The queue scheduling apparatus according to claim 7, wherein,
the categorizing unit is further configured to: after obtaining the next hop address of the message, modify message parameters of the message; wherein, the message parameter is one or more of header field parameters of the message.

9. The queue scheduling apparatus according to claim 7, wherein,
the setting unit is further configured to: set, in the sub-queue, a header used for carrying information of a message total length and a number of messages in the sub-queue; and
the categorizing unit is configured to: add the message to the sub-queue corresponding to the next hop address of the message by means of:
reading the header of the sub-queue; updating the information of the message total length and the number of messages carried by the header; and adding the message to the sub-queue.

10. The queue scheduling apparatus according to claim 7, wherein,
the categorizing unit is further configured to: when the queue comprises at least two sub-queues and when the forwarding unit is forwarding the message in the sub-queue, perform categorizing processing on a newly received message.

11. The queue scheduling apparatus according to claim 7, wherein, the forwarding unit is configured to: forward the message in the sub-queue by means of:
forwarding all messages in the sub-queue to the device corresponding to the destination address of the sub-queue.

12. The queue scheduling apparatus according to claim 7, wherein,
the setting unit is further configured to: set a priority of the sub-queue; and
the forwarding unit is further configured to: forward the message in the sub-queue by means of: preferentially selecting a message of a sub-queue with a high priority for forwarding processing.

13. A queue scheduling system, comprising: at least one message sending apparatus, at least one message receiving apparatus, and at least one queue scheduling apparatus according to claim 7; wherein,
the queue scheduling apparatus is configured to: receive a message sent by the message sending apparatus, and forward the message to the message receiving apparatus.

* * * * *

UNITED STATES PATENT AND TRADEMARK OFFICE
CERTIFICATE OF CORRECTION

PATENT NO. : 9,544,241 B2
APPLICATION NO. : 14/439854
DATED : January 10, 2017
INVENTOR(S) : Laiquan Han It is certified that error appears in the above-identified patent and that said Letters Patent is hereby corrected as shown below:

On the Title Page

Item (73) in the Assignee section, "Sanechips Technology Co., Ltd. (CN)" has been changed to "ZTE CORPORATION and Sanechips Technology Co., Ltd. (CN)"

Signed and Sealed this
Twenty-fifth Day of April, 2017

Michelle K. Lee
*Director of the United States Patent and Trademark Office*